(12) United States Patent
Hironaga et al.

(10) Patent No.: US 10,273,382 B2
(45) Date of Patent: Apr. 30, 2019

(54) ANTI-FOULING COMPOSITION, AND ANTI-FOULING SHEET

(71) Applicant: LINTEC CORPORATION, Itabashi-ku (JP)

(72) Inventors: Maki Hironaga, Saitama (JP); Sou Miyata, Shiraoka (JP); Yoshitomo Ono, Kawaguchi (JP); Yutaka Nanashima, Saitama (JP); Takashi Sugino, Kawaguchi (JP)

(73) Assignee: LINTEC CORPORATION, Itabashi-ku (JP)

( * ) Notice: Subject to any disclaimer, the term of this patent is extended or adjusted under 35 U.S.C. 154(b) by 0 days.

(21) Appl. No.: 15/542,227

(22) PCT Filed: Jan. 12, 2016

(86) PCT No.: PCT/JP2016/050692
§ 371 (c)(1),
(2) Date: Jul. 7, 2017

(87) PCT Pub. No.: WO2016/114258
PCT Pub. Date: Jul. 21, 2016

(65) Prior Publication Data
US 2017/0369738 A1    Dec. 28, 2017

(30) Foreign Application Priority Data
Jan. 13, 2015  (JP) ................. 2015-004447

(51) Int. Cl.
| | | |
|---|---|---|
| *C09D 183/04* | (2006.01) | |
| *C09D 5/16* | (2006.01) | |
| *B32B 27/00* | (2006.01) | |
| *C09K 3/18* | (2006.01) | |
| *B32B 27/28* | (2006.01) | |
| *C08L 83/00* | (2006.01) | |
| *C08G 77/24* | (2006.01) | |

(52) U.S. Cl.
CPC ............ *C09D 183/04* (2013.01); *B32B 27/00* (2013.01); *B32B 27/283* (2013.01); *C08L 83/00* (2013.01); *C09D 5/1675* (2013.01); *C09D 5/1693* (2013.01); *C09K 3/18* (2013.01); *C08G 77/24* (2013.01)

(58) Field of Classification Search
CPC ................... C09D 5/16–5/1662; C09D 5/1675
See application file for complete search history.

(56) References Cited

U.S. PATENT DOCUMENTS

| | | | |
|---|---|---|---|
| 2002/0037417 A1 | 3/2002 | Sato et al. | |
| 2009/0042042 A1 | 2/2009 | Yuki et al. | |
| 2012/0312192 A1 | 12/2012 | Detty et al. | |
| 2014/0154466 A1* | 6/2014 | Liang | C03C 17/30 427/162 |
| 2014/0377552 A1 | 12/2014 | Kurata et al. | |
| 2016/0032146 A1* | 2/2016 | Hozumi | C09D 183/04 528/39 |
| 2017/0101543 A1* | 4/2017 | Hironaga | C09D 183/04 |
| 2017/0313902 A1* | 11/2017 | Shimazaki | C09D 183/04 |

FOREIGN PATENT DOCUMENTS

| | | | |
|---|---|---|---|
| CN | 104039909 A | | 9/2014 |
| JP | 2010-270339 A | | 12/2010 |
| JP | 2010-285574 A | | 12/2010 |
| JP | 2011-84074 A | | 4/2011 |
| JP | 4887783 B2 | | 12/2011 |
| WO | 2014-067769 | | 5/2014 |
| WO | WO 2014/136275 | * | 9/2014 |
| WO | WO 2015/147195 | * | 10/2015 |
| WO | WO 2016/068103 | * | 5/2016 |

OTHER PUBLICATIONS

International Search Report dated Apr. 19, 2016 in PCT/JP2016/050692 filed Jan. 12, 2016.
Extended European Search Report dated Jul. 4, 2018 in Patent Application No. 16737329.9, citing documents AA-AC therein, 6 pages.
The synthetic technique and application of organosilicon product20100131Lai guoqiao et.al Chemical Industry Pressp.202, Claims 1-9, ISBN 978-7-122-06616,9.
Office Action dated Dec. 5, 2018 in the corresponding Chinese patent application No. 201680005151.3, citing documents AO, AP and AW therein, with Translation of Category of Cited Documents.
Office Action dated Feb. 21, 2019, in European Application No. 16 737 329.9. filed Jan. 12, 2016 (with English-language Translation).
C et al., "Silane Coupling Agents: Connecting Across Boundaries", Gelest, Inc., Jan. 1, 2006 (Jan. 1, 2006). XP055096546.

* cited by examiner

*Primary Examiner* — Marc S Zimmer
(74) *Attorney, Agent, or Firm* — Oblon, McClelland, Maier & Neustadt, L.L.P.

(57) ABSTRACT

Provided is an antifouling composition including a tetrafunctional silane-based compound (A) having a specified structure, a trifunctional silane-based compound having a specified structure, and at least one metal catalyst (C) selected from the group consisting of a titanium-based catalyst, an aluminum-based catalyst, a tin-based catalyst, and a zinc-based catalyst, the antifouling composition satisfying the following relational expression (1).

$$1.5 \leq y \leq 2x+1 \quad \text{Expression (1):}$$

In the expression, x indicates the carbon number of an alkyl group that is selected for $R^2$ in the formula (b) representing the silane-based compound (B) and indicates a number of 4 to 22; and y indicates a blending amount ratio (A)/(B) in a molar ratio of the silane-based compound (A) to the silane-based compound (B).

8 Claims, 3 Drawing Sheets

ANTI-FOULING COMPOSITION, AND ANTI-FOULING SHEET

TECHNICAL FIELD

The present invention relates to an antifouling composition and an antifouling sheet including an antifouling layer formed of the antifouling composition.

BACKGROUND ART

In general, it is desirable that water droplets, stains, and so on that may hinder vision do not adhere to the surfaces of windows for buildings, windows for automobiles, windshields for cars, airplanes, ships, and so on, aquariums, ship bottom windows, undersea lives adhesion preventing films for ship bottoms, road panels, such as soundproof walls, etc., mirrors installed in bathrooms, and so on, and molded articles, such as glass chambers, glass accessories, and etc.

By coating the surfaces of such molded articles with a coating film formed of an antifouling substance, or by sticking an antifouling sheet thereto, the surfaces are given water repellency or antifouling properties.

In order to impart water repellency to molded articles, it is known that a layer composed of a fluorine-containing compound, such as a fluororesin, etc., is formed on the surfaces of molded articles.

For example, PTL 1 discloses a water-repellent film-coated article, in which a substrate, such as glass, etc., is coated with a laminate having an underlayer formed of an inorganic compound and a water-repellent film formed of a fluorine-containing compound, which coats the surface of the underlayer.

CITATION LIST

PTL 1: JP 2010-285574A

SUMMARY OF INVENTION

Technical Problem

However, the water-repellent film-coated article described in PTL 1 has a water-repellent film formed of a fluorine-containing compound and is therefore unfavorable from the viewpoint of environmental protection.

In addition, in general, a water-repellent film formed of a fluorine-containing compound has a small slip acceleration for water droplets, and therefore, when water droplets have adhered onto the water-repellent film, the film tends to take much time before the water droplets could slip off therefrom. Consequently, the water-repellent film-coated article described in PTL 1 is unsuitable to applications that are required to have a characteristic capable of instantaneously slipping off water droplets adhering thereto.

Further, an antifouling layer of imparting water repellency and antifouling properties is required to have the curability to an extent that even when rubbed by a finger, discoloration is not caused.

An object of the present invention is to provide an antifouling composition capable of serving as a forming material of an antifouling layer which has favorable curability and also has a large slip acceleration for water droplets, so that it has excellent water repellency that makes water droplets slip off instantly, and also an antifouling sheet including an antifouling layer formed of the antifouling composition.

Solution to Problem

The present inventors have found that an antifouling composition containing a tetrafunctional silane-based compound and a trifunctional silane-based compound having an alkyl group in a proportion so as to satisfy a predetermined relational expression and also including a metal catalyst of a specified kind is able to solve the aforementioned problem, leading to accomplishment of the present invention.

Specifically, the present invention provides the following [1] to [9].

[1] An antifouling composition including
a silane-based compound (A) represented by the following formula (a):

$$Si(OR^1)_p(X^1)_{4-p} \qquad \text{Formula (a):}$$

wherein,
$R^1$ represents an alkyl group having 1 to 6 carbon atoms, and in the case where plural $R^1$s are present, the plural $R^1$s may be the same as or different from each other; $X^1$ represents a halogen atom, and in the case where plural $X^1$s are present, the plural $X^1$s may be the same as or different from each other; and p represents an integer of 0 to 4, a silane-based compound (B) represented by the following formula (b):

$$R^2Si(ORS)_q(X^2)_{3-q} \qquad \text{Formula (b):}$$

wherein,
$R^2$ represents an alkyl group having 4 to 22 carbon atoms, and the alkyl group may have a substituent; $R^3$ represents an alkyl group having 1 to 6 carbon atoms, and in the case where plural $R^3$s are present, the plural $R^3$ may be the same as or different from each other; $X^2$ represents a halogen atom, and in the case where plural $X^2$s are present, the plural $X^2$s may be the same as or different from each other; and q represents an integer of 0 to 3, and at least one metal catalyst (C) selected from the group consisting of a titanium-based catalyst, an aluminum-based catalyst, a tin-based catalyst, and a zinc-based catalyst, the antifouling composition satisfying the following relational expression (1):

$$1.5 \leq y \leq 2x+1 \qquad \text{Expression (1):}$$

wherein,
x indicates the carbon number of the alkyl group that is selected for $R^2$ in the formula (b) representing the silane-based compound (B) and indicates a number of 4 to 22; and y indicates a blending amount ratio (A)/(B) in a molar ratio of the silane-based compound (A) to the silane-based compound (B).

[2] The antifouling composition as set forth above in [1], wherein the content of the component (C) is from 0.01 to 50.0 mol % based on 100 mol % of the total amount of the component (A) and the component (B).

[3] The antifouling composition as set forth above in [1] or [2], wherein the total content of the component (A), the component (B), and the component (C) is 50% by mass or more relative to the total amount of the antifouling composition.

[4] The antifouling composition as set forth above in any one of [1] to [3], further including an acid catalyst (D).

[5] The antifouling composition as set forth above in [4], wherein the component (D) contains at least one acid catalyst selected from the group consisting of hydrochloric acid, phosphoric acid, acetic acid, formic acid, sulfuric acid, methanesulfonic acid, hydrobromic acid, p-toluenesulfonic acid, and trifluoroacetic acid.

[6] An antifouling sheet including an antifouling layer formed of the antifouling composition as set forth above in any one of [1] to [5].
[7] The antifouling sheet as set forth above in [6], including the antifouling layer on a substrate.
[8] The antifouling sheet as set forth above in [6], which has a configuration where the antifouling layer is sandwiched between two release materials.
[9] The antifouling sheet as set forth above in any one of [6] to [8], further including a pressure sensitive adhesive layer.

Advantageous Effects of Invention

The antifouling layer formed of the antifouling composition of the present invention has favorable curability and also has a large slip acceleration for water droplets, so that it has excellent water repellency that makes water droplets slip off instantly.

DESCRIPTION OF EMBODIMENTS

Figure 1:
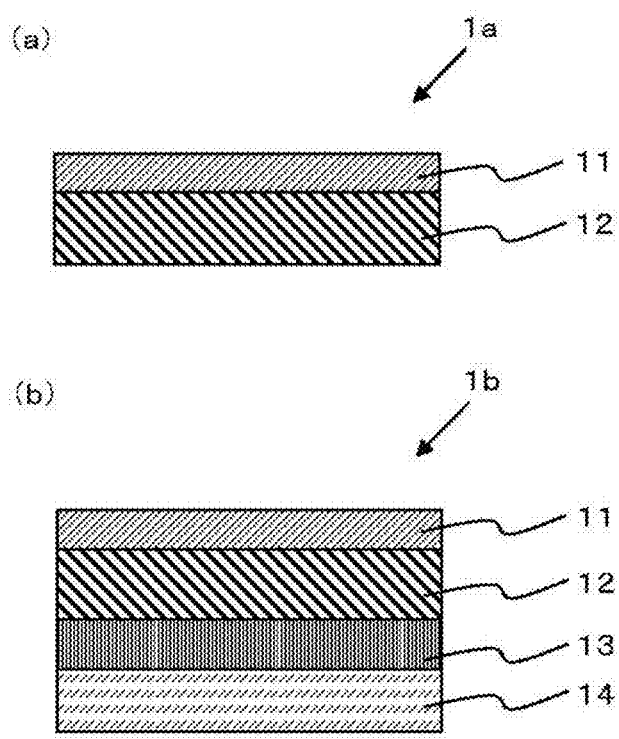
FIG. 1 illustrates cross-sectional views of antifouling sheets each having a substrate, as an embodiment of the present invention.

[Antifouling Composition]
The antifouling composition of the present invention contains a silane-based compound (A) represented by the formula (a), a silane-based compound (B) represented by the formula (b), and at least one metal catalyst (C) selected from the group consisting of a titanium-based catalyst, an aluminum-based catalyst, a tin-based catalyst, and a zinc-based catalyst.
Preferably, the antifouling composition of the present invention further contains an acid catalyst (D). The antifouling composition of the present invention may contain any other additive than the components (A) to (D) within a range where the advantageous effects of the present invention are not impaired.
The antifouling layer formed of the antifouling composition of the present invention has favorable curability and also has a large slip acceleration for water droplets, so that it has excellent water repellency.
As a formation process of the antifouling layer from the antifouling composition containing the silane-based compounds, the silane-based compounds in a coating film formed of the antifouling composition condense each other, and a condensation reaction proceeds to form a polymer. There is thus formed the antifouling layer.
Here, the present inventors have found that by further containing the titanium-based catalyst (C) in the antifouling composition containing the silane-based compounds, the condensation reaction between the silane-based compounds is made to effectively proceed, whereby the antifouling layer with excellent curability may be formed.

In addition, the present inventors have estimated that with respect to the structure of the polymer obtained through the reaction between the silane-based compounds, the presence of the alkyl group in the unit derived from the component (B) ($R^2$ in the formula (b)) contributes to an improvement of the water repellency.
Meanwhile, it has been noted that if the blending amount of the component (B) is increased such that the unit derived from the component (B) becomes dense, the curability of the formed antifouling layer is liable to be lowered.
The present inventors have estimated that the curability of the whole of the antifouling layer is lowered due to an increase of the blending amount of the component (B) which is lower in reactivity of hydrolysis and dehydration condensation than the component (A). In addition, the present inventors have also estimated that the matter that when the alkyl group derived from the component (B) becomes dense, the reactivity between the silane-based compounds becomes low is a cause of lowering of the curability, too.
On the basis of these estimations, the present inventors have paid attention to the formation of the antifouling layer containing a polymer in which the unit derived from the component (A) playing a role of a spacer is introduced between the units derived from the component (B) in an appropriate ratio according to the kind of the alkyl group in the unit derived from the component (B).
Then, the present inventors have derived a specified relational expression and found that if the relational expression is satisfied, the mobility of the alkyl group is controlled, and both the water repellency and the curability of the antifouling layer are improved, leading to accomplishment of the present invention.

<Component (A): Silane-Based Compound Represented by the Formula (a)>

The antifouling composition of the present invention contains a silane-based compound (A) represented by the following formula (a).

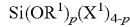

Formula (a):

In the formula (a), $R^1$ represents an alkyl group having 1 to 6 carbon atoms, and in the case where plural $R^1$s are present, the plural $R^1$s may be the same as or different from each other.
$X^1$ represents a halogen atom, and in the case where plural $X^1$s are present, the plural $X^1$s may be the same as or different from each other; and p represents an integer of 0 to 4.
The component (A) may be constituted of only one compound, or may be constituted of two or more compounds represented by the foregoing formula (a).
Examples of the alkyl group that may be selected for $R^1$ include a methyl group, an ethyl group, a n-propyl group, an isopropyl group, a n-butyl group, a s-butyl group, an isobutyl group, a t-butyl group, a n-pentyl group, a n-hexyl group, a neopentyl group, a methylpentyl group, and the like.
The alkyl group that may be selected for $R^1$ may be either linear or branched, but it is preferably linear.
The halogen atom that may be selected for $X^1$ is preferably a chlorine atom, a bromine atom, or an iodine atom, and more preferably a chlorine atom.
The silane-based compound represented by the foregoing formula (a) may be used alone or in combination of two or more thereof.
Preferably, the component (A) contains a silane-based compound represented by the foregoing formula (a) wherein p is 4.

<Component (B): Silane-Based Compound Represented by the Foregoing Formula (b)>

The antifouling composition of the present invention contains a silane-based compound (B) represented by the following formula (b) together with the silane-based compound (A) represented by the foregoing formula (a).

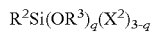   Formula (b):

In the formula (b), $R^2$ represents an alkyl group having 4 to 22 carbon atoms, and the alkyl group may have a substituent.

$R^3$ represents an alkyl group having 1 to 6 carbon atoms, and in the case where plural $R^3$s are present, the plural $R^3$ may be the same as or different from each other.

$X^2$ represents a halogen atom, and in the case where plural $X^2$s are present, the plural $X^2$s may be the same as or different from each other; and q represents an integer of 0 to 3.

The component (B) may be constituted of only one compound, or may be constituted of two or more compounds represented by the formula (b).

The carbon number of the alkyl group that may be selected for $R^2$ is 4 to 22.

When the carbon number of the alkyl group is less than 4, the antifouling layer formed of the resulting antifouling composition has a small slip acceleration for water droplets and takes much time for slipping off water droplets, and is therefore poor in water repellency.

On the other hand, when the carbon number of the alkyl group is more than 22, the curability of the antifouling layer formed of the resulting antifouling composition is poor. In addition, with the increase in the carbon number of the alkyl group, the resulting antifouling composition is liable to be gelled, and the surface state of the antifouling layer formed of the antifouling composition tends to worsen.

From the aforementioned viewpoints, the carbon number of the alkyl group that may be selected for $R^2$ is preferably 4 to 18, more preferably 5 to 16, still more preferably 6 to 14, and yet still more preferably 8 to 12.

The aforementioned carbon number of the alkyl group that may be selected for $R^2$ does not include the carbon number of an arbitrary substituent that the alkyl group may have.

Examples of the alkyl group that may be selected for $R^2$ include a n-butyl group, a s-butyl group, an isobutyl group, a t-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-hexadecyl group, a n-octadecyl group, a n-icosyl group, a n-docosyl group, a methylpentyl group, a pentylhexyl group, a butylpentyl group, a 2-ethylhexyl group, and the like.

The alkyl group may be either linear or branched, but it is preferably a linear alkyl group from the viewpoint of improving the surface state and the curability of the antifouling layer formed of the resulting antifouling composition.

The alkyl group that may be selected for $R^2$ may have a substituent.

Examples of such a substituent include a halogen atom, such as a chlorine atom, a bromine atom, an iodine atom, etc.; a hydroxyl group; a nitro group; an amino group; a cyano group; a thiol group; an epoxy group; a glycidoxy group; a (meth)acryloyloxy group; a cycloalkyl group having 3 to 12 ring-forming carbon atoms (preferably 6 to 10 ring-forming carbon atoms); an aryl group having 6 to 12 ring-forming carbon atoms; a heteroaryl group having 6 to 12 ring-forming atoms, which contains a hetero atom selected from a nitrogen atom, an oxygen atom, and a sulfur atom; an alkoxy group having 1 to 6 carbon atoms (preferably 1 to 3 carbon atoms); an aryloxy group having 6 to 12 ring-forming carbon atoms; and the like. These substituents may be further substituted.

However, the alkyl group that may be selected for $R^2$ is preferably an alkyl group not having a substituent, namely an unsubstituted alkyl group.

Examples of the "alkyl group that may be selected for $R^3$" and the "halogen atom that may be selected for $X^2$" include those mentioned for the "alkyl group that may be selected for $R^1$" and those mentioned for the "halogen atom that may be selected for $X^1$", respectively in the foregoing formula (a).

The silane-based compound represented by the foregoing formula (b) may be used either alone or in combination of two or more thereof.

Preferably, the component (B) contains a silane-based compound represented by the foregoing formula (b) wherein q is 3.

(With Respect to Relational Expression (1))

The antifouling composition of the present invention satisfies the following relational expression (1) in the relation between the component (A) and the component (B).

$1.5 \leq y \leq 2x+1$   Expression (1):

In the expression (1), x indicates the carbon number of the alkyl group that is selected for $R^2$ in the formula (b) representing the silane-based compound (B). As mentioned previously, in the case where the alkyl group that is selected for $R^2$ has the aforementioned substituent, the carbon number of the substituent is not included in x.

Namely, x is a number of 4 to 22, and as mentioned previously, x is preferably a number of 4 to 18, more preferably a number of 5 to 16, still more preferably a number of 6 to 14, and yet still more preferably a number of 8 to 12.

In the case where the component (B) is constituted of two or more silane-based compounds represented by the foregoing formula (b), the number of x is a weighted average of the carbon number of the alkyl group that each of the compounds has.

Here, in general, the variable "2x+1" represents a bond number of the carbon atoms constituting the alkyl group that the component (B) has, to the hydrogen atoms or substituents; however, in the present invention, it is an index expressing the size of the alkyl group (chain length of the alkyl group).

In addition, y indicates a blending amount ratio (A)/(B) in a molar ratio of the component (A) to the component (B).

As mentioned previously, in a process of forming the antifouling layer from the antifouling composition of the present invention, a polymer is formed through a condensation reaction between the silane-based compounds in the composition. The polymer has a structure in which the unit derived from the component (A) playing a role of a spacer is introduced between the units derived from the component (B). For that reason, as the value of y is larger, the blending amount of the component (A) that is a spacer increases, and therefore, it may be considered that an average distance between the units derived from the component (B) becomes large.

Namely, the value of y is an index indicating the distance between the units derived from the component (B).

In order to improve the curability of the antifouling layer formed of the antifouling composition, it may be considered that it is necessary to thoroughly secure the distance between the units derived from the component (B) to an extent that the mobility of the alkyl group of the component (B) may be sufficiently ensured.

In order to improve the water repellency of the antifouling layer, it may be considered that it is necessary to increase the blending amount of the component (B) to increase an existence ratio (existence density) of the alkyl group in the structure of the polymer, or to select an alkyl group having a long chain length to make the influence of the alkyl group in the polymer large.

For example, in a polymer in which the blending amount of the component (A) serving as a spacer is large, and the average distance between the units derived from the component (B) is large, the existence ratio (existence density) of the alkyl group of the component (B) becomes small, and thus, in order to improve the water repellency of the antifouling layer, it is necessary to select an alkyl group that is large, namely long in the chain length to some extent.

Figure 3:
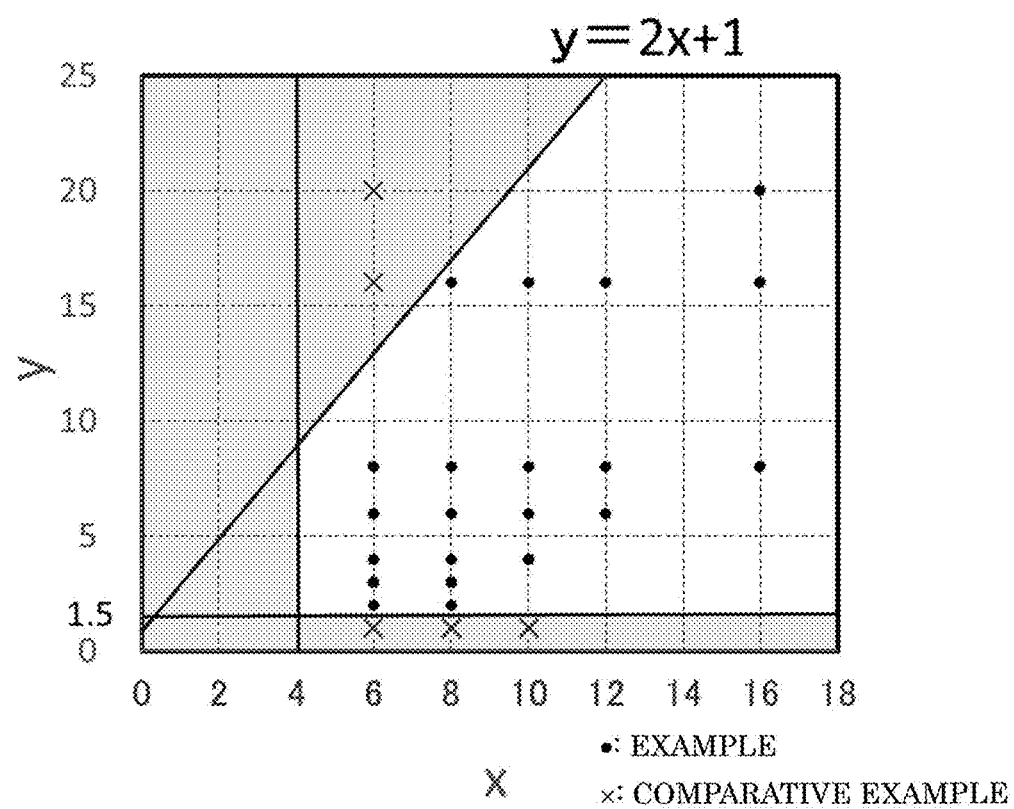
FIG. 3 is a graph illustrating a relation between a carbon number x of an alkyl group of the used trifunctional silane-based compound and a molar ratio ((tetrafunctional silane-based compound)/(trifunctional silane-based compound)) y of the used tetrafunctional silane-based compound to the used trifunctional silane-based compound with respect to Examples 1 to 22 and Comparative Examples 1 to 8.

FIG. 3 is a graph illustrating a relation between the carbon number x of an alkyl group of the used trifunctional silane-based compound and the molar ratio ((tetrafunctional silane-based compound)/(trifunctional silane-based compound)) y of the used tetrafunctional silane-based compound to the used trifunctional silane-based compound with respect to Examples 1 to 22 and Comparative Examples 1 to 8 as mentioned later.

As shown in FIG. 3, the present inventors have obtained a large number of experimental data with respect to the relation between the "blending amount ratio in a molar ratio of the component (A) to the component (B)" and the "carbon number of the alkyl group of the component (B)", totalized those data, and then verified them.

As a result, the present inventors have paid attention to the matter that when the "blending amount ratio in a molar ratio of the component (A) to the component (B)" and the "carbon number of the alkyl group of the component (B)" are selected so as to satisfy the relational expression (1), both the water repellency and the curability of the antifouling layer formed of the antifouling composition may be improved, leading to accomplishment of the present invention.

From the totalized results of the experimental data obtained by the present inventors, it has become clear that when the value of y that is the blending amount ratio in a molar ratio of the component (A) to the component (B) is less than the variable "2x+1", the water repellency of the antifouling layer formed of the resulting antifouling composition is lowered.

Namely, when the carbon number x of the alkyl group of the component (B) is large, the selection range of the value of y becomes broad; however, when the carbon number x of the alkyl group of the component (B) is small, it is necessary to make the value of y that is the blending amount ratio in a molar ratio of the component (A) to the component (B) small to make the proportion of the component (A) serving as a spacer small, thereby increasing the existence ratio of the alkyl group of the component (B).

The value of y is 1.5 or more from the viewpoint of improving the curability of the antifouling layer formed of the antifouling composition. The value of y is preferably 2.0 or more, more preferably 2.5 or more, still more preferably 3.0 or more, and yet still more preferably 4.0 or more.

<Component (C): Metal Catalyst>

The antifouling composition of the present invention contains at least one metal catalyst (C) selected from the group consisting of a titanium-based catalyst, an aluminum-based catalyst, a tin-based catalyst, and a zinc-based catalyst.

When the antifouling composition contains such metal catalyst (C) of a specified kind, the condensation reaction of the component (A) and the component (B) may be effectively promoted to improve the curability of the antifouling layer formed of the antifouling composition.

In addition, when the antifouling composition contains the metal catalyst (C) together with the component (A) and the component (B), the curing reaction may be made to proceed even in an environment of a relatively low temperature (130° C. or lower). For that reason, even in that case of forming the antifouling layer formed of the antifouling composition on a substrate with low heat resistance, such as vinyl chloride, etc., the antifouling layer may be formed even in a low-temperature environment enough for possibly suppressing heat shrinkage of the substrate.

As the titanium-based catalyst, any compounds containing a titanium atom are usable, and examples thereof include a titanium alkoxide, a titanium chelate, a titanium acylate, and the like. In addition, a hydroxide, an acetate, a carbonate, a sulfate, a nitrate, and a chloride, each containing a titanium atom, and so on are also usable.

Examples of the titanium alkoxide include titanium tetraisopropoxide, titanium tetra-n-butoxide, a titanium butoxide dimer, titanium tetra-2-ethylhexoxide, and the like.

Examples of the titanium chelate include a titanium acetylacetonate, such as titanium diisopropoxy bis(acetylacetonate), titanium tetraacetylacetonate, titanium diisopropoxy bis(ethylacetoacetate), titanium diisopropoxy bis (triethanolaminate), etc.; a titanium octylene glyconate, such as titanium tetraoctylene glyconate, titanium dioctyloxy bis(octylene glyconate), titanium di-2-ethylhexoxy bis(2-ethyl-3-hydroxyhexoxide), etc.; titanium lactate, a titanium lactate ammonium salt, and the like.

Examples of the titanium acylate include polyhydroxytitanium stearate and the like.

As the aluminum-based catalyst, any compounds containing an aluminum atom are usable, and examples thereof include an acetoacetate complex of aluminum, an acetylacetonate complex of aluminum, and the like.

Examples of the acetoacetate complex of aluminum include diisopropoxyaluminum monooleyl acetoacetate, monoisopropoxyaluminum bisoleyl acetoacetate, monoisopropoxyaluminum monooleate monoethyl acetoacetate, diisopropoxyaluminum monolauryl acetoacetate, diisopropoxyaluminum monostearyl acetoacetate, diisopropoxyaluminum monoisostearyl acetoacotate, monoisopropoxyaluminum mono-N-lauroyl-β-alanate monolauryl acetoacetate, aluminum trisacetyl acetonate, and the like.

Examples of the acetylacetonate complex of aluminum include a monoacetylacetonatoaluminum bis(isobutyl acetoacetate) chelate, a monoacetylacetonatoaluminum bis (2-ethylhexyl acetoacetate) chelate, a monoacetylacetonatoaluminum bis(dodecyl acetoacetate) chelate, a monoacetylacetonatoaluminum bis(oleyl acetoacetate) chelate, and the like.

As the tin-based catalyst, any compounds containing a tin atom are usable, and examples thereof include an organic tin compound, such as stannous octoate, dibutyltin diacetate, dibutyltin dilaurate, dibutyltin mercaptide, dibutyltin thiocarboxylate, dibutyltin dimaleate, dioctyltin mercaptide, dioctyltin thiocarboxylate, etc.; an inorganic tin compound; and the like.

As the zinc-based catalyst, any compounds containing a zinc atom are usable, and examples thereof include zinc-chromium oxide, zinc-aluminum oxide, zinc-aluminum-chromium oxide, zinc-chromium-manganese oxide, zinc-iron oxide, zinc-iron-aluminum oxide, and the like.

Preferably, the metal catalyst (C) contains at least the titanium-based catalyst from the viewpoint of effectively promoting the condensation reaction between the silane-based compounds to improve the curability of the antifouling layer formed of the antifouling composition as well as the viewpoint of providing the antifouling composition capable of making the curing reaction proceed even in an environment of a relatively low temperature (130° C. or lower).

The titanium-based catalyst is preferably a titanium chelate, more preferably a titanium acetylacetonate or a titanium octylene glyconate, and still more preferably titanium ethyl acetonate.

The content of the component (C) in the antifouling composition is preferably 0.01 to 50.0 mol %, more preferably 0.10 to 20.0 mol %, still more preferably 0.3 to 10.0 mol %, yet still more preferably 0.50 to 6.00 mol %, and even yet still more preferably 0.70 to 3.50 mol % based on 100 mol % of the total amount of the component (A) and the component (B) from the viewpoint of improving the curability of the antifouling layer formed of the antifouling composition as well as the viewpoint of providing the antifouling composition capable of making the curing reaction proceed even in an environment of a relatively low temperature (130° C. or lower).

<Component (D): Acid Catalyst>

Preferably, the antifouling composition of the present invention further contains an acid catalyst (D) from the viewpoint of more improving the curability of the antifouling layer formed of the antifouling composition.

When the acid catalyst (D) is contained in the antifouling composition, the hydrolysis of the reactive functional groups which the component (A) and the component (B) have is promoted, and the condensation reaction between the silane-based compounds is more promoted, thereby enabling one to form the antifouling layer with excellent curability.

The acid catalyst (D) is not particularly limited so long as it is a component having an function to promote the hydrolysis of the reactive functional groups of the component (A) and the component (B). From the viewpoint of more improving the curability of the antifouling layer formed of the antifouling composition, it is preferred to contain at least one acid catalyst selected from the group consisting of hydrochloric acid, phosphoric acid, acetic acid, formic acid, sulfuric acid, methanesulfonic acid, hydrobromic acid, p-toluenesulfonic acid, and trifluoroacetic acid, and it is more preferred to contain hydrochloric acid.

The content of the component (D) in the antifouling composition is preferably 0.001 to 1.000 mol %, more preferably 0.005 to 0.500 mol %, still more preferably 0.010 to 0.100 mol %, and yet still more preferably 0.020 to 0.070 mol % based on 100 mol % of the total amount of the component (A) and the component (B) from the viewpoint of more improving the curability of the antifouling layer formed of the antifouling composition.

<Other Additives>

The antifouling composition may further contain any other additive than the aforementioned components (A) to (D) within a range where the advantageous effects of the present invention are not impaired.

Examples of other additive include a resin component, a curing agent, an anti-aging agent, a light stabilizer, a flame retardant, an electroconductive agent, an antistatic agent, a plasticizer, and the like.

The content of each of these additives is preferably 0 to 20% by mass, more preferably 0 to 10% by mass, still more preferably 0 to 5% by mass, and yet still more preferably 0 to 2% by mass relative to the total amount of the antifouling composition.

The total content of the component (A), the component (B), and the component (C) in the antifouling composition is preferably 50% by mass or more, more preferably 65% by mass or more, still more preferably 80% by mass or more, and yet still more preferably 90% by mass or more, and preferably 99.9% by mass or less, and more preferably 99.0% by mass or less relative to the total amount (100% by mass of the active components) of the antifouling composition.

The terms "active components" referred to in the present specification mean the components excluding a diluent solvent.

The total content of the component (A), the component (B), and the component (C) is preferably 50 mol % or more, more preferably 65 mol % or more, still more preferably 80 mol % or more, and yet still more preferably 90 mol % or more, and preferably 99.9 mol % or less, and more preferably 99.0 mol % or less based on 100 mol % of the active components of the antifouling composition.

The content of a fluorine-containing compound in the antifouling composition is preferably less than 10% by mass, more preferably less than 5% by mass, still more preferably less than 1% by mass, and yet still more preferably less than 0.01% by mass relative to the total amount (100% by mass of the active components) of the antifouling composition from the viewpoint of environmental aspects.

[Configuration of Antifouling Sheet]

The antifouling sheet of the present invention is not particularly limited so long as it is a sheet having the antifouling layer formed of the aforementioned antifouling composition of the present invention.

FIG. 1 illustrates cross-sectional views of antifouling sheets each having a substrate, as an embodiment of the present invention.

As the antifouling sheet having a substrate, there is exemplified an antifouling sheet 1a having a configuration in which an antifouling layer 11 is laminated on a substrate 12 as shown in FIG. 1(a).

In addition, the antifouling sheet may also be an antifouling sheet 1b in which a pressure sensitive adhesive layer 13 and a release material 14 are further provided on the surface opposite to that having the antifouling layer 11 of the substrate 12 as shown in FIG. 1(b).

In order to protect the antifouling layer 11 at the time of storage, a release material may be further provided on the antifouling layer 11 of this antifouling sheet 1a or 1b.

Figure 2:
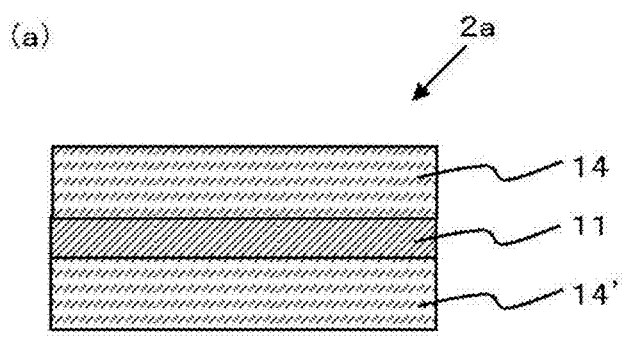
FIG. 2 illustrates cross-sectional views of antifouling sheets each not having a substrate, as an embodiment of the present invention.
Figure 2:
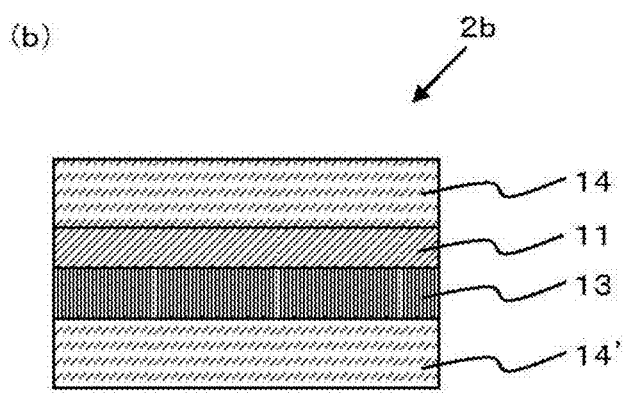

FIG. 2 illustrates cross-sectional views of antifouling sheets each not having a substrate, as an embodiment of the present invention.

As the antifouling sheet not having a substrate, there is exemplified an antifouling sheet 2a having a configuration in which the antifouling layer 11 is sandwiched between two release materials 14 and 14' as shown in FIG. 2(a).

In addition, the antifouling sheet may also be an antifouling sheet 2b in which the pressure sensitive adhesive layer 13 is further provided between the antifouling layer 11 and the release material 14' as shown in FIG. 2(b).

The thickness of the antifouling layer which the antifouling sheet of the present invention has is preferably 0.001 to 40 μm, more preferably 0.005 to 25 μm, still more preferably 0.01 to 15 μm, and yet still more preferably 0.05 to 5 μm from the viewpoint of providing the antifouling sheet having a large slip acceleration for water droplets, so that it has excellent water repellency that makes water droplets slip off instantly.

When water droplets are dropped on the surface of the antifouling layer of the antifouling sheet of the present invention, the slip acceleration for water droplets is preferably 180 mm/s$^2$ or more, more preferably 190 mm/s$^2$ or more, still more preferably 230 mm/s$^2$ or more, and yet still more preferably 450 mm/s$^2$ or more.

The value of the slip acceleration for water droplets means the value calculated according to the method described in the Examples.

[Substrate]

Examples of the substrate which the antifouling sheet of the present invention has include a paper substrate, a resin film or sheet, a substrate prepared by laminating a paper substrate with a resin, and the like, and may be suitably selected in accordance with an application of the antifouling sheet.

Examples of the paper that constitutes a paper substrate include thin paper, medium-quality paper, wood-free paper, impregnated paper, coated paper, art paper, parchment paper, glassine paper, and the like.

Examples of the resin that constitute a resin film or sheet include polyolefin resins, such as polyethylene, polypropylene, etc.; vinyl-based resins, such as polyvinyl chloride, polyvinylidene chloride, polyvinyl alcohol, an ethylene-vinyl acetate copolymer, an ethylene-vinyl alcohol copolymer, etc.; polyester-based resins, such as polyethylene terephthalate, polybutylene terephthalate, polyethylene naphthalate, etc.; polystyrene; an acrylonitrile-butadiene-styrene copolymer; cellulose triacetate; a polycarbonate; urethane resins, such as polyurethane, acryl-modified polyurethane, etc.; and the like.

Examples of the substrate prepared by laminating a paper substrate with a resin includes laminate papers prepared by laminating the aforementioned paper substrate with a thermoplastic resin, such as polyethylene, etc.; and the like.

Among these substrates, a resin film or sheet is preferred, a film or sheet formed of a polyester-based resin is more preferred, and a film or sheet formed of polyethylene terephthalate (PET) is still more preferred.

As the substrate which is used in the present invention, a primer layer-provided substrate in which a primer layer is provided on the surface of the aforementioned substrate may also be used from the viewpoint of improving the adhesiveness thereof to the antifouling layer.

Examples of the component that constitutes the primer layer include a polyester-based resin, a urethane-based resin, a polyester urethane-based resin, an acrylic resin, and the like. These resins may be used either alone or in combination of two or more thereof.

In the case where the substrate which is used in the present invention is a resin film or sheet, the surface of such a resin film or sheet may be subjected to a surface treatment, such as an oxidation method, a roughening method, etc., as the need arises, from the viewpoint of improving the adhesiveness thereof to the antifouling layer.

The oxidation treatment is not particularly limited, and examples thereof include a corona discharge treatment method, a plasma treatment method, chromic acid oxidation (wet treatment), a flame treatment, a hot blast treatment, an ozone-UV ray irradiation treatment, and the like.

The roughening method is not particularly limited, and examples thereof include a sand blast method, a solvent treatment method, and the like.

Though such a surface treatment is suitably selected according to the kind of the substrate, a corona discharge treatment method is preferred from the viewpoint of improving the adhesiveness to the antifouling layer as well as the viewpoint of operability.

Though the thickness of the substrate is suitably selected according to an application of the antifouling sheet, it is preferably 10 to 250 μm, more preferably 15 to 200 μm, and still more preferably 20 to 150 μm from the viewpoints of handleability and economic efficiency.

The substrate which is used in the present invention may further contain a UV ray absorbent, a light stabilizer, an antioxidant, an antistatic agent, a slip agent, an antiblocking agent, a colorant, or the like.

[Release Material]

As the release material which is used in the present invention, a release sheet prepared through a double-side release treatment, a release sheet prepared through a single-side release treatment, and the like are usable, and examples thereof include one prepared by coating a substrate for release material with a release agent and the like.

Examples of the substrate for release material include the paper substrate, the resin film or sheet, and the substrate prepared by laminating a paper substrate with a resin, each being usable as the substrate which the antifouling sheet of the present invention has, and the like.

Examples of the release agent include a silicone-based resin, an olefin-based resin, an isoprene-based resin, a rubber-based elastomer, such as a butadiene-based resin, etc., a long-chain alkyl-based resin, an alkyd-based resin, a fluororesin, and the like.

Though the thickness of the release material is not particularly limited, it is preferably 10 to 200 μm, and more preferably 25 to 150 μm.

[Pressure Sensitive Adhesive Layer]

In the case where the antifouling sheet of the present invention has a pressure sensitive adhesive layer, the pressure sensitive adhesive that constitutes the pressure sensitive adhesive layer can be suitably selected according to an application of the antifouling sheet.

Specifically, examples of the pressure sensitive adhesive include an acrylic pressure sensitive adhesive, a urethane-based pressure sensitive adhesive, a silicone-based pressure sensitive adhesive, a rubber-based pressure sensitive adhesive, a polyester-based pressure sensitive adhesive, a UV ray-curable type pressure sensitive adhesive, and the like.

These pressure sensitive adhesives may be used either alone or in combination of two or more thereof.

Though the thickness of the pressure sensitive adhesive layer is not particularly limited, it is preferably 1 to 100 μm, and more preferably 5 to 80 μm.

[Production Method of Antifouling Sheet]

The production method of the antifouling sheet of the present invention is not particularly limited, and examples thereof include a method of coating the aforementioned antifouling composition of the present invention onto the substrate or release material by a known coating method to form a coating film, followed by drying the coating film.

Preferably, the antifouling composition of the present invention is dissolved in an organic solvent and coated in a form of solution onto the substrate or release material by a known coating method.

Examples of the solvent include methanol, ethanol, propanol, butanol, isopropyl alcohol, methyl ethyl ketone, methyl isobutyl ketone, ethyl acetate, toluene, and the like.

Examples of the coating method include a spin coating method, a spray coating method, a bar coating method, a knife coating method, a roll knife coating method, a roll coating method, a blade coating method, a die coating method, a gravure coating method, and the like.

After forming the coating film, the drying temperature and drying time of the coating film are not particularly limited and may be suitably set.

However, according to the antifouling composition of the present invention, the curing reaction may be made to proceed even in an environment of a relatively low temperature as 130° C. or lower, and in the case using a substrate with low heat resistance, such as vinyl chloride, etc., heat shrinkage of the substrate may be suppressed.

For that reason, the drying temperature is preferably 10 to 130° C., more preferably 20 to 120° C., still more preferably 40 to 110° C., and yet still more preferably 50 to 95° C. from the aforementioned viewpoints as well as the viewpoint of productivity.

In order to protect the surface of the antifouling layer at the time of storage, the release material may be further laminated on the formed antifouling layer.

Furthermore, by sticking a pressure sensitive adhesive layer formed on another release material onto the formed antifouling layer, a pressure sensitive adhesive layer-provided antifouling sheet may also be produced as in the antifouling sheet 1b of FIG. 1(b) or the antifouling sheet 2b of FIG. 2(b).

EXAMPLES

Examples 1 to 22 and Comparative Examples 1 to 8

(1) Preparation of Antifouling Composition

Respective components of the kind and blending ratio (active component ratio, mol %) shown in each of Tables 1 and 2 were blended, and ethanol was added to dilute the blend, thereby preparing a solution of an antifouling composition having an active component concentration of 1.8 M.

(2) Production of Antifouling Sheet

A polyethylene terephthalate (PET) film having a primer layer provided on one surface thereof (trade name "COSMOSHINE A-4100" having a thickness of 50 μm, manufactured by Toyobo Co., Ltd.) was used as a substrate.

On the primer layer of this PET film, the above-prepared solution of antifouling composition was coated using a Mayer bar, thereby preparing a coating film. Subsequently, the coating film was dried at 80° C. for 2 minutes, thereby producing an antifouling sheet having an antifouling layer having a thickness of 0.7 μm.

In preparing the antifouling composition in each of the Examples and Comparative Examples, details of the used respective components shown in Tables 1 and 2 are as follows.

<Tetrafunctional Silane-Based Compound>

"TEOS": Tetraethoxysilane that is the tetrafunctional silane-based compound represented by the foregoing formula (a) wherein p is 4, and $R^1$ is an ethyl group <Trifunctional Silane-Based Compound>

"Hexyltriethoxysilane": Trifunctional silane-based compound represented by the foregoing formula (b) wherein q is 3, $R^2$ is a n-hexyl group (carbon number: 6), and $R^3$ is an ethyl group "Octyltriethoxysilane": Trifunctional silane-based compound represented by the foregoing formula (b) wherein q is 3, $R^2$ is a n-octyl group (carbon number: 8), and $R^3$ is an ethyl group "Decyltriethoxysilane": Trifunctional silane-based compound represented by the foregoing formula (b) wherein q is 3, $R^2$ is a n-decyl group (carbon number: 10), and $R^3$ is an ethyl group "Dodecyltriethoxysilane": Trifunctional silane-based compound represented by the foregoing formula (b) wherein q is 3, $R^2$ is a n-dodecyl group (carbon number: 12), and $R^3$ is an ethyl group "Hexadecyltriethoxysilane": Trifunctional silane-based compound represented by the foregoing formula (b) wherein q is 3, $R^2$ is a n-hexadecyl group (carbon number: 16), and $R^3$ is an ethyl group <Metal-Based Catalyst>

"Titanium-based catalyst TC-750": Trade name "ORGATIX TC-750" for titanium diisopropoxy bis(ethylacetoacetate), manufactured by Matsumoto Fine Chemical Co., Ltd.

"Titanium-based catalyst TC-200": Trade name "ORGATIX TC-200" for titanium di-2-ethylhexoxy bis(2-ethyl-3-hydroxyhexoxide), manufactured by Matsumoto Fine Chemical Co., Ltd.

"Zirconium-based catalyst ZC-580": Trade name "ORGATIX ZC-580" for zirconium dibutoxy bis(ethylacetoacetate), manufactured by Matsumoto Fine Chemical Co., Ltd.

"Zirconium-based catalyst ZC-700": Trade name "ORGATIX ZC-700" for zirconium tetracetylacetonate, manufactured by Matsumoto Fine Chemical Co., Ltd.

<Acid Catalyst>

"Hydrochloric Acid": 0.01M Hydrochloric Acid

The antifouling layer formed of the antifouling composition prepared in each of the Examples and Comparative Examples was evaluated for the characteristics thereof, according to the methods mentioned below. The results are shown in Table 3.

<Curability of Antifouling Layer>

The surface of the antifouling layer of the antifouling sheet was rubbed 20 times with a finger, the antifouling layer was then visually observed, and the curability of the antifouling layer was evaluated according to the following criteria. The case where a coating film formed of the antifouling composition was not cured, so that an antifouling layer was not formed was given the evaluation of "D".

A: There was seen no change in the color as compared with that before rubbing the antifouling layer with a finger.

B: The color was slightly changed white, but the change was on an acceptable level.

C: The color was changed white.

D: The coating film formed of the antifouling composition was not cured, so that an antifouling layer could not be formed.

The antifouling sheets given the evaluation of "C" or "D" in the curability of the antifouling layer were not on a usable level, and therefore, they were not evaluated in point of the following "water droplet slipping properties of antifouling layer" and "slip acceleration".

<Water Droplet Slipping Properties of Antifouling Layer and Slip Acceleration for Water Droplets>

The antifouling sheet produced in each of the Examples and Comparative Examples was, while stretched in wet, put on a stage at a tilt angle of 35 degrees in such a manner that the antifouling layer thereof was exposed out, and water droplets (30 μL) were dropped onto the antifouling layer of the antifouling sheet, the movement of the water droplets was observed, and the water droplet slipping properties of the antifouling layer were evaluated according to the following criteria.

A: The water droplets slipped off at a fast speed without stopping on the way.

B: The water droplets slipped off without stopping on the way, but the slip speed was dearly slow as compared with the evaluation "A".

C: While the water droplets slipped off at the beginning, a uniform acceleration motion was not exhibited, and the water droplets did not continuously slip off.

With respect to the antifouling layers evaluated as "A" or "B" in the water droplet slipping properties, a relationship between the slip distance and the slip time of the water droplets was measured, and the slip acceleration was calculated from the resulting relationship. Specifically, the slip distance per unit time was differentiated, and the speed change per unit time was calculated; and furthermore, the speed change per unit time was differentiated, and the acceleration (slip acceleration) was calculated from the resulting regression line. Table 3 shows a value of the calculated slip acceleration.

TABLE 1

| | Composition of antifouling composition | | | | | | |
|---|---|---|---|---|---|---|---|
| | Tetrafunctional silane-based compound | | Trifunctional silane-based compound | | | | |
| | Kind | Blending ratio (mol %) | Kind | Blending ratio (mol %) | x | y ((A)/(B)) | 2x + 1 |
| Example 1 | TEOS | 100 | Hexyltriethoxysilane | 50.00 | 6 | 2.0 | 13 |
| Example 2 | TEOS | 100 | Hexyltriethoxysilane | 33.33 | 6 | 3.0 | 13 |
| Example 3 | TEOS | 100 | Hexyltriethoxysilane | 25.00 | 6 | 4.0 | 13 |
| Example 4 | TEOS | 100 | Hexyltriethoxysilane | 16.67 | 6 | 6.0 | 13 |
| Example 5 | TEOS | 100 | Hexyltriethoxysilane | 12.50 | 6 | 8.0 | 13 |
| Example 6 | TEOS | 100 | Octyltriethoxysilane | 50.00 | 8 | 2.0 | 17 |
| Example 7 | TEOS | 100 | Octyltriethoxysilane | 33.33 | 8 | 3.0 | 17 |
| Example 8 | TEOS | 100 | Octyltriethoxysilane | 25.00 | 8 | 4.0 | 17 |
| Example 9 | TEOS | 100 | Octyltriethoxysilane | 16.67 | 8 | 6.0 | 17 |
| Example 10 | TEOS | 100 | Octyltriethoxysilane | 12.50 | 8 | 8.0 | 17 |
| Example 11 | TEOS | 100 | Octyltriethoxysilane | 6.25 | 8 | 16.0 | 17 |
| Example 12 | TEOS | 100 | Decyltriethoxysilane | 25.00 | 10 | 4.0 | 21 |
| Example 13 | TEOS | 100 | Decyltriethoxysilane | 16.67 | 10 | 6.0 | 21 |
| Example 14 | TEOS | 100 | Decyltriethoxysilane | 12.50 | 10 | 8.0 | 21 |
| Example 15 | TEOS | 100 | Decyltriethoxysilane | 6.25 | 10 | 16.0 | 21 |
| Example 16 | TEOS | 100 | Dodecyltriethoxysilane | 16.67 | 12 | 6.0 | 25 |
| Example 17 | TEOS | 100 | Dodecyltriethoxysilane | 12.50 | 12 | 8.0 | 25 |
| Example 18 | TEOS | 100 | Dodecyltriethoxysilane | 6.25 | 12 | 16.0 | 25 |
| Example 19 | TEOS | 100 | Hexadecyltriethoxysilane | 12.50 | 16 | 8.0 | 33 |
| Example 20 | TEOS | 100 | Hexadecyltriethoxysilane | 6.25 | 16 | 16.0 | 33 |
| Example 21 | TEOS | 100 | Hexadecyltriethoxysilane | 5.00 | 16 | 20.0 | 33 |
| Example 22 | TEOS | 100 | Decyltriethoxysilane | 25.00 | 10 | 4.0 | 21 |

| | Composition of antifouling composition | | | | | |
|---|---|---|---|---|---|---|
| | Metal-based catalyst | | | Acid catalyst | | |
| | Kind | Blending ratio (mol %) | Relative to ((A) + (B)) (mol %) | Kind | Blending ratio (mol %) | Relative to ((A) + (B)) (mol %) |
| Example 1 | Titanium-based catalyst TC-750 | 3.000 | 2.000 | Hydrochloric acid | 0.059 | 0.040 |
| Example 2 | Titanium-based catalyst TC-750 | 2.667 | 2.000 | Hydrochloric acid | 0 053 | 0.040 |
| Example 3 | Titanium-based catalyst TC-750 | 2.500 | 2.000 | Hydrochloric acid | 0.044 | 0.036 |
| Example 4 | Titanium-based catalyst TC-750 | 2.333 | 2.000 | Hydrochloric acid | 0.059 | 0.051 |
| Example 5 | Titanium-based catalyst TC-750 | 2.250 | 2.000 | Hydrochloric acid | 0.053 | 0.047 |
| Example 6 | Titanium-based catalyst TC-750 | 3.000 | 2.000 | Hydrochloric acid | 0.044 | 0.030 |
| Example 7 | Titanium-based catalyst TC-750 | 2.667 | 2.000 | Hydrochloric acid | 0.059 | 0.044 |
| Example 8 | Titanium-based catalyst TC-750 | 2.500 | 2.000 | Hydrochloric acid | 0.053 | 0.043 |
| Example 9 | Titanium-based catalyst TC-750 | 2.333 | 2.000 | Hydrochloric acid | 0.044 | 0.038 |
| Example 10 | Titanium-based catalyst TC-750 | 2.250 | 2.000 | Hydrochloric acid | 0.053 | 0.047 |
| Example 11 | Titanium-based catalyst TC-750 | 2.125 | 2.000 | Hydrochloric acid | 0.044 | 0.042 |
| Example 12 | Titanium-based catalyst TC-750 | 2.500 | 2.000 | Hydrochloric acid | 0.059 | 0.047 |
| Example 13 | Titanium-based catalyst TC-750 | 2.333 | 2.000 | Hydrochloric acid | 0.053 | 0.046 |
| Example 14 | Titanium-based catalyst TC-750 | 2.250 | 2.000 | Hydrochloric acid | 0.044 | 0.040 |
| Example 15 | Titanium-based catalyst TC-750 | 2.125 | 2.000 | Hydrochloric acid | 0.053 | 0.050 |
| Example 16 | Titanium-based catalyst TC-750 | 2.333 | 2.000 | Hydrochloric acid | 0.059 | 0.051 |
| Example 17 | Titanium-based catalyst TC-750 | 2.250 | 2.000 | Hydrochloric acid | 0.053 | 0.047 |
| Example 18 | Titanium-based catalyst TC-750 | 2.125 | 2.000 | Hydrochloric acid | 0.044 | 0.042 |
| Example 19 | Titanium-based catalyst TC-750 | 2.250 | 2.000 | Hydrochloric acid | 0.059 | 0.053 |
| Example 20 | Titanium-based catalyst TC-750 | 2.125 | 2.000 | Hydrochloric acid | 0.053 | 0.050 |
| Example 21 | Titanium-based catalyst TC-750 | 2.100 | 2.000 | Hydrochloric acid | 0.044 | 0.042 |
| Example 22 | Titanium-based catalyst TC-200 | 2.500 | 2.000 | Hydrochloric acid | 0.059 | 0.047 |

TABLE 2

| | Composition of antifouling composition | | | | | | |
|---|---|---|---|---|---|---|---|
| | Tetrafunctional silane-based compound | | Trifunctional silane-based compound | | | | |
| | Kind | Blending ratio (mol %) | Kind | Blending ratio (mol %) | x | y ((A)/(B)) | 2x + 1 |
| Comparative Example 1 | TEOS | 100 | Hexyltriethoxysilane | 100.00 | 6 | 1.0 | 13 |
| Comparative Example 2 | TEOS | 100 | Octyltriethoxysilane | 100.00 | 8 | 1.0 | 17 |
| Comparative Example 3 | TEOS | 100 | Decyltriethoxysilane | 100.00 | 10 | 1.0 | 21 |
| Comparative Example 4 | TEOS | 100 | Hexyltriethoxysilane | 6.25 | 6 | 16.0 | 13 |
| Comparative Example 5 | TEOS | 100 | Hexyltriethoxysilane | 5.00 | 6 | 20.0 | 13 |
| Comparative Example 6 | TEOS | 100 | Decyltriethoxysilane | 25.00 | 10 | 4.0 | 21 |
| Comparative Example 7 | TEOS | 100 | Decyltriethoxysilane | 25.00 | 10 | 4.0 | 21 |
| Comparative Example 8 | TEOS | 100 | Decyltriethoxysilane | 25.00 | 10 | 4.0 | 21 |

| | Composition of antifouling composition | | | | | |
|---|---|---|---|---|---|---|
| | Metal-based catalyst | | | Acid catalyst | | |
| | Kind | Blending ratio (mol %) | Relative to ((A) + (B)) (mol %) | Kind | Blending ratio (mol %) | Relative to ((A) + (B)) (mol %) |
| Comparative Example 1 | Titanium-based catalyst TC-750 | 4.000 | 2.000 | Hydrochloric acid | 0.053 | 0.027 |
| Comparative Example 2 | Titanium-based catalyst TC-750 | 4.000 | 2.000 | Hydrochloric acid | 0.063 | 0.031 |
| Comparative Example 3 | Titanium-based catalyst TC-750 | 4.000 | 2.000 | Hydrochloric acid | 0.063 | 0.031 |
| Comparative Example 4 | Titanium-based catalyst TC-750 | 2.125 | 2.000 | Hydrochloric acid | 0.053 | 0.050 |
| Comparative Example 5 | Titanium-based catalyst TC-750 | 2.100 | 2.000 | Hydrochloric acid | 0.053 | 0.051 |
| Comparative Example 6 | — | 0 | 0 | Hydrochloric acid | 0.059 | 0.047 |
| Comparative Example 7 | Zirconium-based catalyst ZC-580 | 2.500 | 2.000 | Hydrochloric acid | 0.059 | 0.047 |
| Comparative Example 8 | Zirconium-based catalyst ZC-700 | 2.500 | 2.000 | Hydrochloric acid | 0.059 | 0.047 |

TABLE 3

| | Evaluation item | | |
|---|---|---|---|
| | Curability of antifouling layer | Water droplet slipping properties of antifouling layer | Slip acceleration (mm/s$^2$) |
| Example 1 | A | A | 249 |
| Example 2 | A | A | 563 |
| Example 3 | A | A | 579 |
| Example 4 | A | A | 363 |
| Example 5 | A | A | 459 |
| Example 6 | A | A | 893 |
| Example 7 | A | A | 948 |
| Example 8 | A | A | 1205 |
| Example 9 | A | A | 740 |
| Example 10 | A | A | 901 |
| Example 11 | A | A | 540 |
| Example 12 | A | A | 1298 |
| Example 13 | A | A | 824 |
| Example 14 | A | A | 881 |
| Example 15 | A | A | 527 |
| Example 16 | A | A | 1932 |
| Example 17 | A | A | 1933 |
| Example 18 | A | A | 1265 |
| Example 19 | B | A | 1041 |
| Example 20 | B | A | 715 |
| Example 21 | B | A | 285 |
| Example 22 | A | A | 950 |
| Comparative Example 1 | C | —(*1) | —(*1) |
| Comparative Example 2 | D | —(*1) | —(*1) |
| Comparative Example 3 | D | —(*1) | —(*1) |
| Comparative Example 4 | A | C | —(*2) |
| Comparative Example 5 | A | C | —(*2) |
| Comparative Example 6 | D | —(*1) | —(*1) |
| Comparative Example 7 | C | —(*1) | —(*1) |

TABLE 3-continued

| | Evaluation item | | |
|---|---|---|---|
| | Curability of antifouling layer | Water droplet slipping properties of antifouling layer | Slip acceleration (mm/s$^2$) |
| Comparative Example 8 | C | —(*1) | —(*1) |

(*1): Since the results that the "Curability of antifouling layer" is poor were brought, the test was finished without conducting the evaluations of the "Water droplet slipping properties of antifouling layer" and "Slip acceleration".
(*2): The calculation of the "Slip acceleration" was not conducted.

As in Table 3, there were revealed such results that the antifouling layers formed of the antifouling compositions of Examples 1 to 22 were favorable in the curability and also had excellent water repellency capable of slipping off the water droplets instantly.

On the other hand, there were revealed such results that the antifouling layers formed of the antifouling compositions of Comparative Examples 1 to 3 and 6 to 8 were poor in the curability. Accordingly, it was judged that the antifouling sheets having such an antifouling layer were useless, and therefore, the antifouling layers were not evaluated for the water droplet slipping properties of antifouling layer and slip acceleration for water droplets.

In addition, the antifouling sheets using the antifouling compositions of Comparative Examples 4 and 5 did not exhibit a uniform acceleration motion, and the water droplets did not continuously slip off.

As shown in FIG. 3, the Examples and the Comparative Examples are clearly distinguished from each other according to whether or not the relation between "x" that is a carbon number of an alkyl group of the "trifunctional silane-based compound" used in each of the Examples and Comparative Examples and "y" that is a molar ratio ((tetrafunctional silane-based compound)/(trifunctional silane-based compound)) of the tetrafunctional silane-based compound to the trifunctional silane-based compound as used satisfies the aforementioned relational expression (1).

Namely, it is also noted from FIG. 3 that by selecting the "blending amount ratio in a molar ratio of the component (A) to the component (B)" and the "carbon number of the alkyl group of the component (B)" so as to satisfy the aforementioned relational expression (1), the antifouling layer which is improved in both the curability and the water repellency can be formed.

INDUSTRIAL APPLICABILITY

The antifouling layer formed of the antifouling composition of the present invention has favorable curability and also has a large slip acceleration for water droplets, so that it has excellent water repellency that makes water droplets slip off instantly.

Accordingly, the antifouling sheet of the present invention having the foregoing antifouling layer is favorable, for example, as an antifouling sheet for preventing water droplets, stains and the like that may hinder vision, from adhering to the surfaces of windows for buildings, windows for automobiles, windshields for vehicles, airplanes, ships, and the like, aquariums, ship bottom windows, undersea lives adhesion preventing films for ship bottoms, road panels, such as soundproof walls, etc., mirrors installed in bathrooms and the like, and molded articles, such as glass chambers, glass accessories, etc., and is more favorable for applications that require water repellency capable of instantaneously slipping off water droplets, such as for windows for automobiles, windshields for cars, airplanes, ships, etc., and the like.

REFERENCE SIGNS LIST 1a, 1b, 2a, 2b: Antifouling sheet
11: Antifouling layer
12: Substrate
13: Pressure sensitive adhesive layer
14, 14': Release material

The invention claimed is:

1. An antifouling composition, comprising:
a silane-based compound (A) represented by the following formula (a):

$$Si(OR^1)_p(X^1)_{4-p};\qquad\text{Formula (a):}$$

a silane-based compound (B) represented by the following formula (b):

$$R^2Si(OR^3)_q(X^2)_{3-q};\text{ and}\qquad\text{Formula (b):}$$

at least one metal catalyst (C) selected from the group consisting of a titanium-based catalyst, an aluminum-based catalyst, a tin-based catalyst, and a zinc-based catalyst,
wherein:
R$^1$ represents an alkyl group having 1 to 6 carbon atoms, and in the case where plural R$^1$s are present, the plural R$^1$s may be the same as or different from each other;
X$^1$ represents a halogen atom, and in the case where plural X$^1$s are present, the plural X$^1$s may be the same as or different from each other;
p represents an integer of 0 to 4;
R$^2$ represents an alkyl group having 4 to 22 carbon atoms, and the alkyl group may have a substituent;
R$^3$ represents an alkyl group having 1 to 6 carbon atoms, and in the case where plural R$^3$s are present, the plural R$^3$ may be the same as or different from each other;
X$^2$ represents a halogen atom, and in the case where plural X$^2$s are present, the plural X$^2$s may be the same as or different from each other;
q represents an integer of 0 to 3;
the antifouling composition satisfying the following relational expression (1):

$$1.5\le y\le 2x+1;\qquad\text{Expression (1):}$$

x indicates the carbon number of the alkyl group that is selected for R$^2$ in the formula (b) representing the silane-based compound (B) and indicates a number of 4 to 22; and
y indicates a blending amount ratio (A)/(B) in a molar ratio of the silane-based compound (A) to the silane-based compound (B), and
wherein the total content of the component (A), the component (B), and the component (C) is 50% by mass or more relative to the total amount of the antifouling composition.

2. The antifouling composition according to claim 1, wherein the content of the component (C) is from 0.01 to 50.0 mol % based on 100 mol % of the total amount of the component (A) and the component (B).

3. The antifouling composition according to claim 1, further comprising:
an acid catalyst (D).

4. The antifouling composition according to claim 3, wherein the component (D) contains at least one acid catalyst selected from the group consisting of hydrochloric acid, phosphoric acid, acetic acid, formic acid, sulfuric acid, methanesulfonic acid, hydrobromic acid, p-toluenesulfonic acid, and trifluoroacetic acid.

5. An antifouling sheet, comprising an antifouling layer formed of the antifouling composition according to claim 1.

6. The antifouling sheet according to claim 5, comprising the antifouling layer on a substrate.

7. The antifouling sheet according to claim 5, which has a configuration where the antifouling layer is sandwiched between two release materials.

8. The antifouling sheet according to claim 5, further comprising:

a pressure sensitive adhesive layer.

* * * * *